Figure 1:
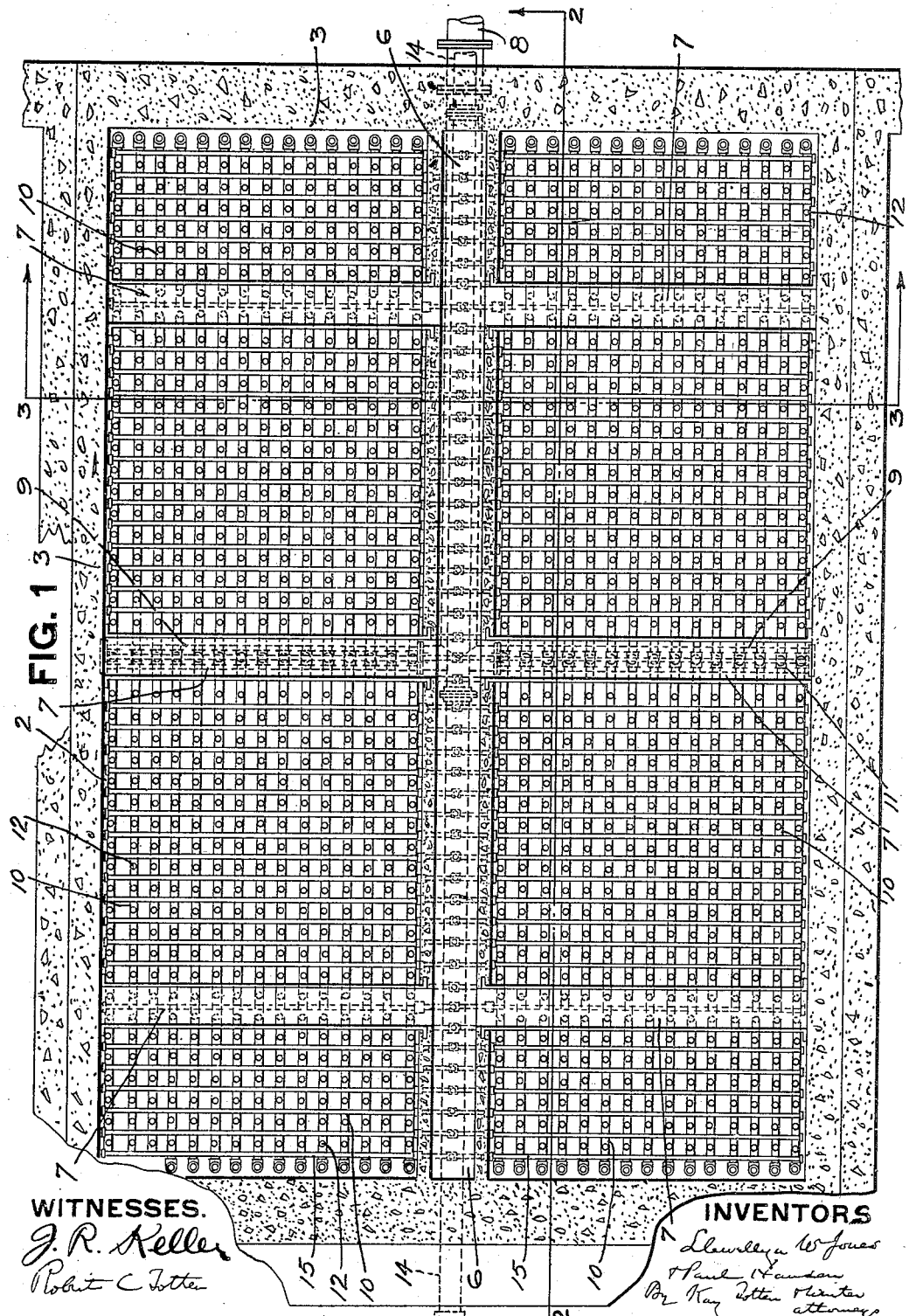

No. 879,876. PATENTED FEB. 25, 1908.
L. W. JONES & P. HANSEN.
FILTER.
APPLICATION FILED APR. 13, 1905.

3 SHEETS—SHEET 1.

WITNESSES. INVENTORS

No. 879,876. PATENTED FEB. 25, 1908.
L. W. JONES & P. HANSEN.
FILTER.
APPLICATION FILED APR. 13, 1905.
3 SHEETS—SHEET 2.
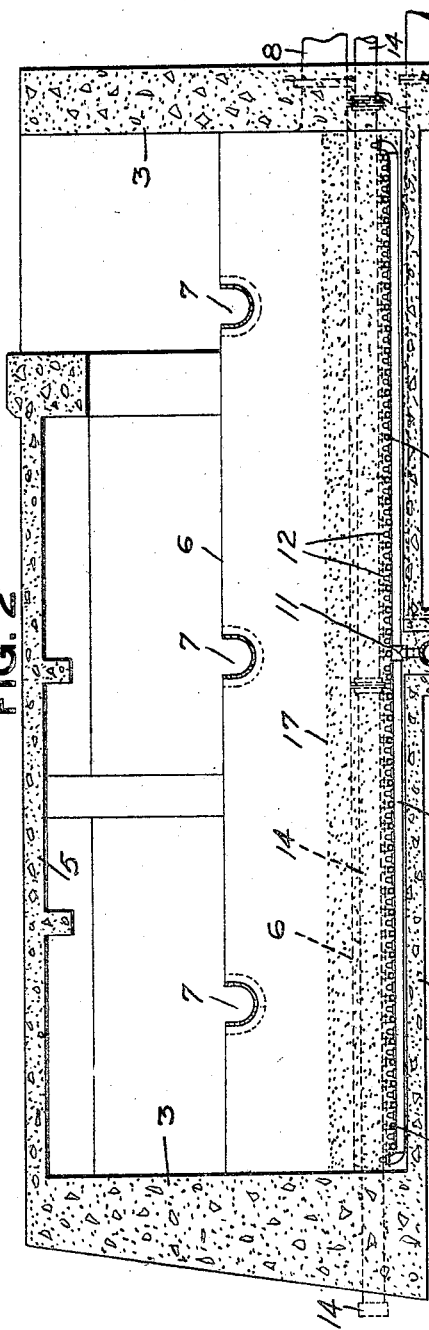
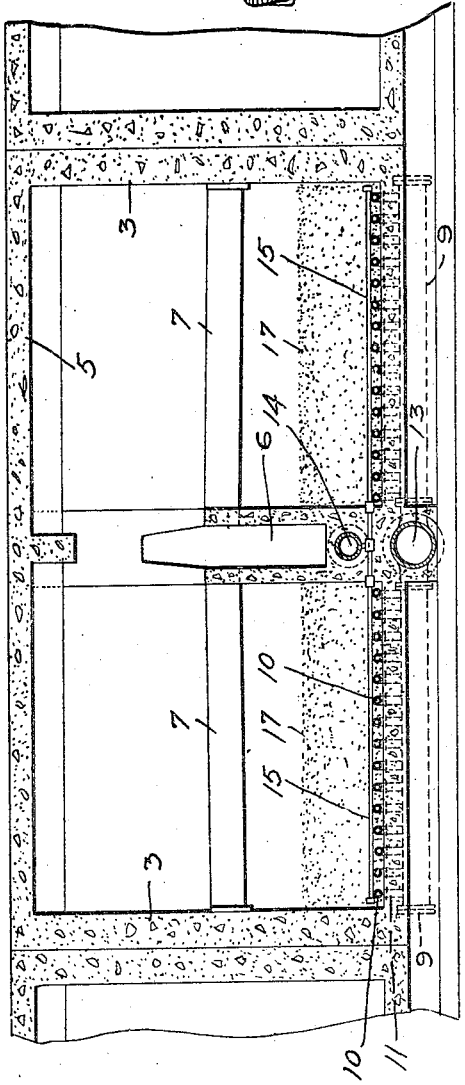
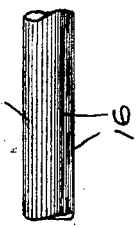
WITNESSES. INVENTORS No. 879,876. PATENTED FEB. 25, 1908.
L. W. JONES & P. HANSEN.
FILTER.
APPLICATION FILED APR. 13, 1905.
3 SHEETS—SHEET 3.
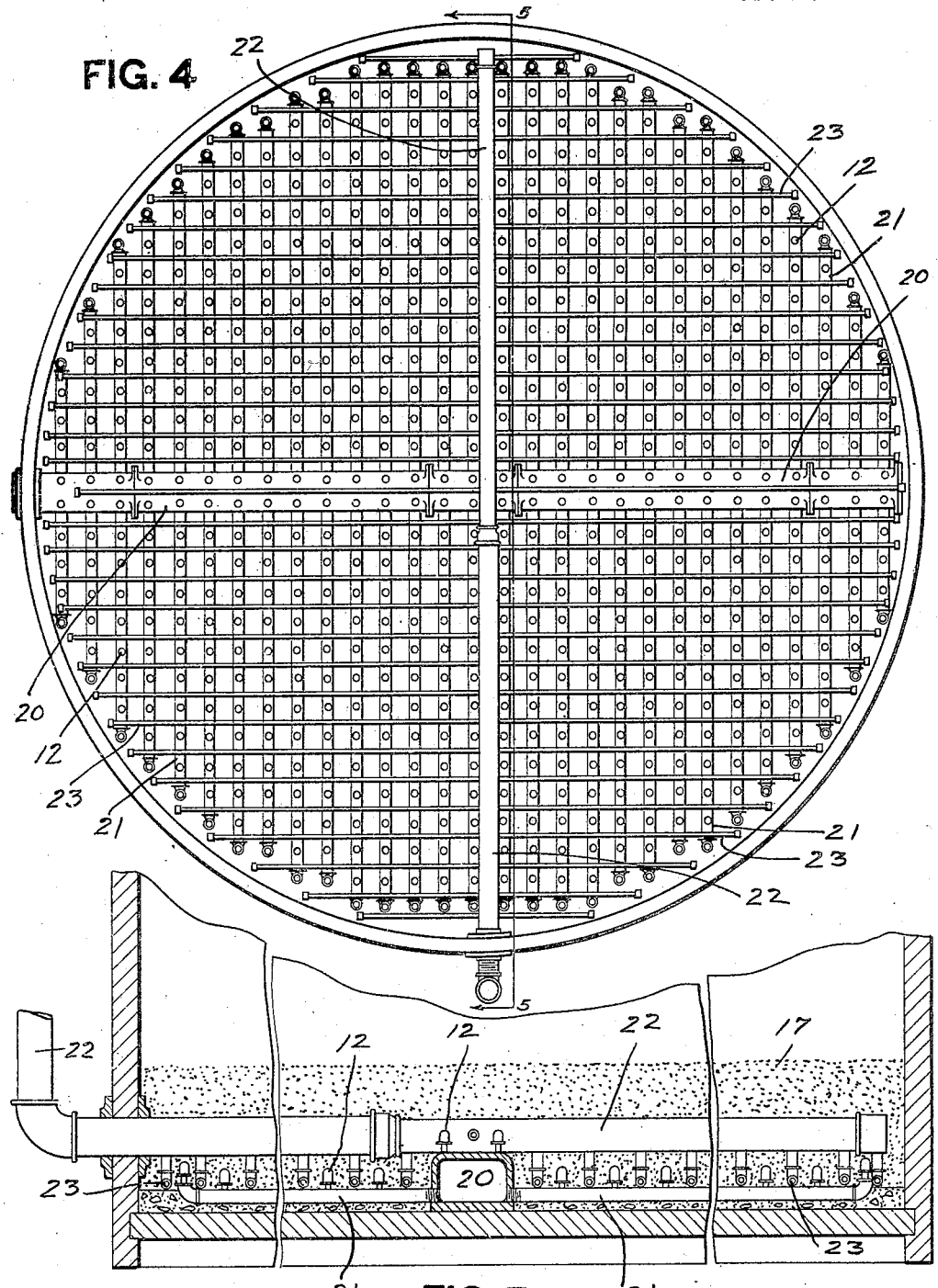
WITNESSES. FIG. 5 INVENTORS

UNITED STATES PATENT OFFICE.

LLEWELLYN W. JONES, OF SEWICKLEY, AND PAUL HANSEN, OF PITTSBURG, PENNSYLVANIA, ASSIGNORS TO PITTSBURGH FILTER MANUFACTURING COMPANY, OF PITTSBURG, PENNSYLVANIA, A CORPORATION OF PENNSYLVANIA.

FILTER.

No. 879,876.

Specification of Letters Patent.

Patented Feb. 25, 1908.

Application filed April 13, 1905. Serial No. 255,376.

*To all whom it may concern:*

Be it known that we, LLEWELLYN W. JONES, a resident of Sewickley, in the county of Allegheny and State of Pennsylvania, and PAUL HANSEN, of Pittsburg, county and State aforesaid, have invented a new and useful Improvement in Filters; and we do hereby declare the following to be a full, clear, and exact description thereof.

Our invention relates to filters and more especially to sand filters in which the filtering bed has from time to time to be agitated and washed so as to clean the bed.

The object of our invention is to provide for the admission of the air separately with the water in cleaning so as to thoroughly agitate and disintegrate the sand bed; and so that the particles will be separated and thoroughly washed and the scum and dirt removed before the sand bed is allowed to settle again for further filtration.

To these ends our invention comprises the novel features hereinafter set forth and claimed.

To enable others skilled in the art to make and use our invention we will describe the same more fully, referring to the accompanying drawing in which—

Figure 1 is a plan view of a filtration bed embodying our invention; Fig. 2 is a longitudinal section thereof; Fig. 3 is a cross section on the line 3—3 Fig. 1; Figs. 4 and 5 are views of a modified form; Fig. 6 is an enlarged view of a portion of one of the air-pipes.

In the drawings the numeral 2 designates a suitable tank or reservoir rectangular in form and composed of the concrete walls 3, the bottom 4 and the top 5. Arranged longitudinally of the bed 2 and preferably at about the mid-point thereof is the gutter 6. Communicating with said gutter 6 are the overflow troughs 7 which extend from said gutter to the side walls. An inlet 8 admits the raw water to the gutter 6 during the filtering process and during the cleaning process the said inlet 8 acts as an outlet for the dirty water.

Embedded in the concrete in the bottom of the filter bed is the manifold pipe 9 which extends across the filter bed at about the mid-point thereof. The pipes 10 communicate with the manifold 9 by means of the T-s 11, said pipes being arranged parallel to each other at suitable distances apart and extending for substantially the entire length of the filter. These pipes 10 are provided with suitable nozzles or strainers 12 through which the water passes from the sand into the pipes 10, whence it is conducted to the manifold 9. A conduit 13 connected with the manifold 9, said conduit being adapted to carry off the clear water and deliver it to the pipes from which it is conveyed to the point of consumption.

An air pipe 14 is embedded in the concrete just below the central gutter 6 and above the manifold 9, said pipe being connected up with any suitable air-compressor. Communicating with the air-pipe 14 are the small pipes 15 which extend from said air-pipe from each side thereof toward the walls of the filter, said pipes running at right angles to the water-pipes 10. These air-pipes 15 are provided with openings 16 preferably located on their lower sides, and said openings may be in the form of slots. By having said openings on the lower side of the pipes there is less liability of the pipes becoming clogged with the sand of the filtration bed, while at the same time they are self draining. The sand or other filtering material is indicated by the numeral 17, and the pipes 10 and 15 are embedded therein.

In Figs. 4 and 5 we have illustrated our invention as applied to a circular tank. In this case the manifold 20 extends across the tank so as to substantially bisect the same. The water pipes 21 project from both sides of said manifold. The air supply pipe 22 is located above and crosses said manifold at substantially its mid-point. The air-pipes 23 extend in both directions from the pipe 22 and cross said pipes 21.

When the process of filtering is going on the air-pipe 14 is closed and the raw water entering the gutter 6 rises therein until it flows into the troughs 7, whence it overflows in an even stream onto the sand 17. The water then passes down through the sand in which it deposits its impurities and passing through the nozzles 12 into the pipes 10, is conveyed to the manifold 9, whence the clear water is drawn off through the pipe 13. When, however, it is desired to clean the sand of the filter bed, the valve admitting the raw water to the inlet 8 is closed and the valve leading to the sewer is opened. The valve leading to the air-pipe 14 is also opened and the compressor started to furnish air to said pipe. The air from the air-pipe 14 is distributed through the pipes 15 and escaping from the openings therein passes up with the water from pipe 13 through the sand 17. The action of the air acts to break up and disintegrate the conglomerate mass of sand and separate the particles thereof so that they are thoroughly washed. When by the action of the air the mass of sand has been properly broken up or disintegrated the air supply is cut off. The valve of the clear water-pipe 13 having been closed, the pipe 13 is now connected up with the wash water-pipes. This wash-water is admitted to the pipe 13 and passing through the manifold 9 forces its way up through the pipes 10 and nozzles 12 into the filter-bed. The water and sand rise within the filter and the overflow consisting of the scum and filth is carried off by the central gutter 6 and passing out the pipe 8 is carried off through the waste pipe to the sewer. When the sand has been thoroughly washed the wash-water is shut off from the pipe 13 and the sand in the filter is permitted to settle. After the sand has properly settled the raw-water is again introduced by the pipe 8 and the valve of the pipe 13 opened, whereupon the process of filtration goes on as before. If desired the air and water may be introduced to the filter bed at the same time in cleaning.

What I claim is:

1. In a filter, the combination of a tank or reservoir, a bed of filtering material, a wall in said tank having a gutter therein, an air supply pipe in said wall below said gutter, a plurality of air pipes having openings therein extending in both directions from said air supply pipe, a manifold below said air pipe and crossed thereby, and a plurality of pipes extending in both directions from said manifold.

2. In a filter, the combination of a tank, or reservoir, a bed of filtering material, a wall in said tank having a gutter therein, an air supply pipe in said wall below said gutter, and a manifold below said air pipe and crossed thereby.

In testimony whereof we the said LLEWELLYN W. JONES and PAUL HANSEN have hereunto set our hands.

LLEWELLYN W. JONES.
PAUL HANSEN.

Witnesses:
ROBERT C. TOTTEN,
G. KREMER.